United States Patent
Moayerzadeh Ahmadi et al.

(10) Patent No.: US 9,277,502 B2
(45) Date of Patent: Mar. 1, 2016

(54) HIBERNATE MODE FOR CHAT SERVICE

(75) Inventors: Alireza Moayerzadeh Ahmadi, San Jose, CA (US); Sameer Fahad Khalid Moidu, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/019,970

(22) Filed: Feb. 2, 2011

(65) Prior Publication Data

US 2012/0198006 A1    Aug. 2, 2012

(51) Int. Cl.
*G06F 15/16* (2006.01)
*H04W 52/02* (2009.01)
*H04L 12/58* (2006.01)

(52) U.S. Cl.
CPC ........... *H04W 52/0254* (2013.01); *H04L 51/04* (2013.01); *H04L 51/38* (2013.01)

(58) Field of Classification Search
CPC ........................... H04L 12/581; H04L 12/5815
USPC ........................................................ 709/206
See application file for complete search history.

(56) References Cited

U.S. PATENT DOCUMENTS

| | | | | |
|---|---|---|---|---|
| 7,269,629 | B2* | 9/2007 | Zmudzinski et al. | 709/207 |
| 7,493,390 | B2* | 2/2009 | Bobde et al. | 709/224 |
| 7,587,462 | B2* | 9/2009 | Zmudzinski et al. | 709/207 |
| 7,752,268 | B2* | 7/2010 | Shah | 709/206 |
| 7,912,903 | B2* | 3/2011 | Shah | 709/206 |
| 8,060,572 | B2* | 11/2011 | Brown et al. | 709/206 |
| 8,082,552 | B2* | 12/2011 | Agrawal | 719/315 |
| 2004/0128310 | A1* | 7/2004 | Zmudzinski et al. | 707/102 |
| 2007/0271384 | A1* | 11/2007 | Zmudzinski et al. | 709/227 |
| 2010/0332212 | A1* | 12/2010 | Finkelman | 703/23 |
| 2011/0302436 | A1* | 12/2011 | Clark et al. | 713/323 |
| 2012/0150789 | A1* | 6/2012 | Jhoney et al. | 706/52 |

* cited by examiner

*Primary Examiner* — Azizul Choudhury
(74) *Attorney, Agent, or Firm* — Baker Botts L.L.P.

(57) ABSTRACT

Methods, apparatuses and systems directed to hibernating a client of an instant messaging service. A user wishing to conserve battery life and connection overhead in a mobile device may transmit a hibernate command to a chat server. Although the user's connection is torn down, the user will still maintain a presence on the instant messaging service and be able to receive messages.

22 Claims, 5 Drawing Sheets

HIBERNATE MODE FOR CHAT SERVICE

TECHNICAL FIELD

The present disclosure relates generally to instant messaging on mobile devices, and, in particular, establishing a hibernate mode so that a mobile device can power down, but still maintain a presence on the instant messaging system to receive instant messages.

BACKGROUND

Instant messaging on mobile devices is nearly ubiquitous. Users often install multiple clients such as AOL instant messenger, Yahoo! messenger, Google gchat, MSN messenger, Kik messenger, BlackBerry messenger, etc. on their mobile devices to remain in constant connection with their friends, family, and co-workers. However, maintaining the data connection from a mobile device to an instant messaging server requires a constant data connection, which is expensive both from a traffic and battery life standpoint. Therefore, users may wish to power down their device to save battery life while still maintaining a presence on the IM server so that they may continue to receive messages.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to an instant messaging service that provides users with the ability to set a "hibernate" mode, wherein the user powers down his or her mobile device, or at a very minimum, tears down the battery-draining connection to the instant messaging (IM) server, while still maintaining an "available" presence to the IM system and receiving messaging through an alternate protocol, such a push notification. The method allows a mobile device to select between message delivery optimized for high traffic and message delivery optimized for low traffic based on user activity.

Implementations of the present invention extend these concepts by allowing the IM server to store messages to be delivered to the user when he or she exits hibernate mode, or to deliver the instant messages to the user through the form of a push notification or short message system (SMS) message. In particular embodiments, the first message received destined for the user after the user enters hibernate mode is encoded with a token, that serves as a pointer to the message history. After the user exits hibernate mode, the message server retrieves all messages received after the message identified in the token and delivers the consolidated message stream to a user.

Figure 1:
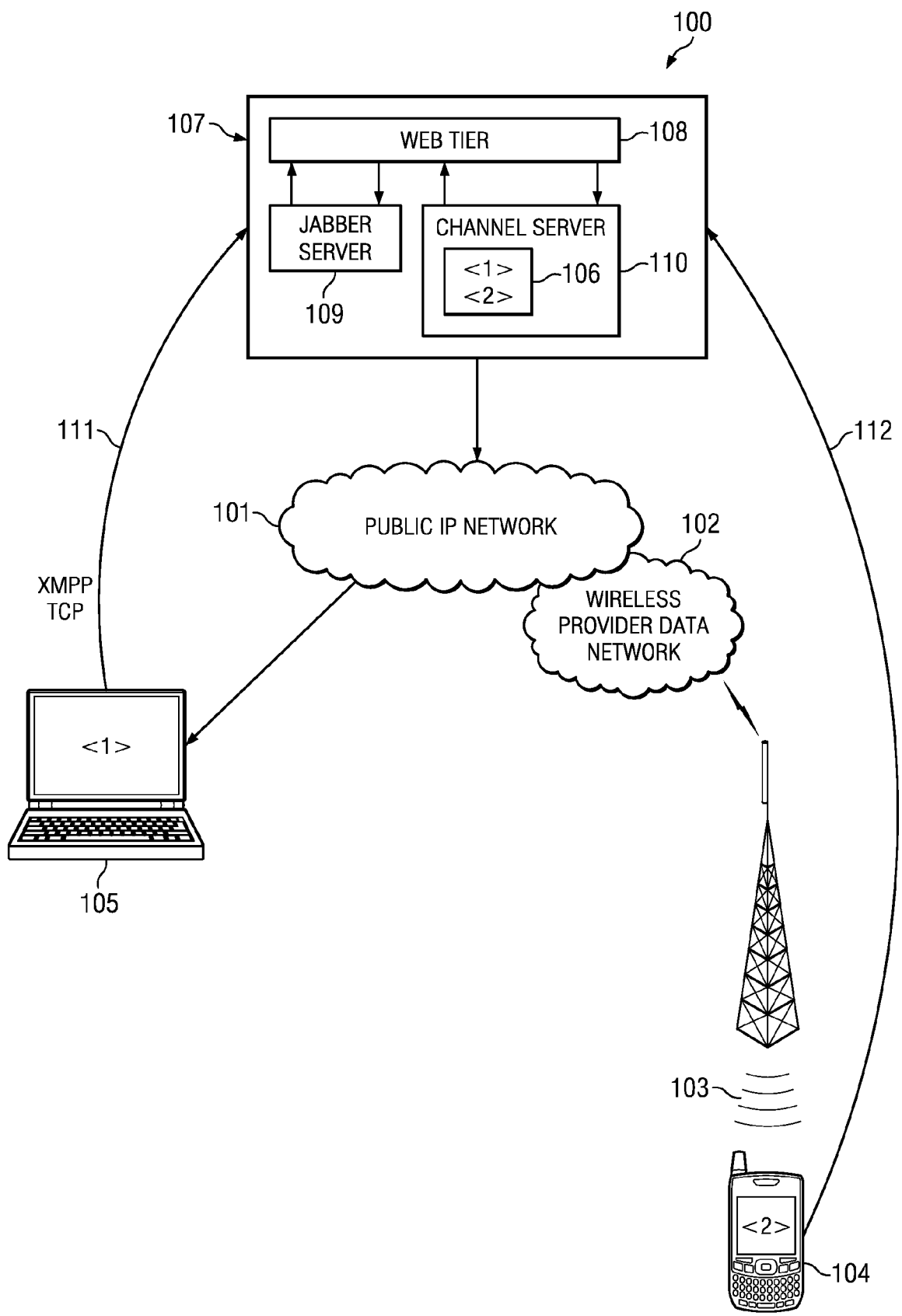
FIG. 1 illustrates an example instant messaging (IM) system 100.

FIG. 1 illustrates an example instant messaging (IM) system 100. IM server 107 is connected via public IP network (the Internet) 101. IM server 107 includes web tier 108, Jabber server 109, and channel server 110. Web tier 108 includes business logic, such as privacy and permissions, for allowing clients to access IM server 107 or be contacted by other users. Web tier also maintains a client timeout timer; the timer is reset every time mobile device 104 pings web tier 108. If the timer expires without receiving a ping from mobile device 104, the client associated with mobile device 104 is disconnected. In particular embodiments, this ping is sent every 60 minutes. Jabber server 109 is responsible for communicating Extensible Messaging and Presence Protocol (XMPP) messages to and from the clients, and to translate jabber protocol messages to proprietary IM service protocols. Jabber server 109 also stores messages for offline clients for later delivery. Channel server 110 acts as the master server and maintains presence information for the various clients of IM system 100 to inform other users who is available for message delivery. In particular embodiments, IM server 107 can be a single server housing one or more of web tier 108, Jabber server 109, and channel server 110. In particular embodiments, IM server 107 is a logical construct, and one or more of web tier 108, Jabber server 109, and channel server 110 are separate and independent servers connected through IP networks.

IM client 1 (with identifier "<1">") connects to IM server 107 using a standard personal computer (PC) 105 through public internet protocol (IP) network 101, establishing a transmission control protocol (TCP) session (although XMPP is the preferred protocol for exchanging instant messages, the transport protocol, in one implementation, is still TCP) with the IM server 107. Other logical or transport layer connection protocols can also be used. This connection is shown by line 111 (it is understood that line 111 should be shown through public IP network 101 but for the sake of clarity it is drawn outside of public IP network 101.) IM server 107 updates an entry in its presence information data structure 106 residing in channel server 110, showing a "<1>" in the data structure to identify that client 105 is available to receive instant messages.

Mobile client 2, identified by the label "<2>" connects using wireless mobile device 104. Mobile device 104 connects to IM server 107 through a physical wireless medium to a cellular tower 103 connected to a wireless service provider's data network 102, then through the public IP network. Much like client 1, mobile client 2 establishes a TCP session 112 with the IM server 107. The IM server records the client 104's presence information in the channel server 110, indicated by the entry "<2>" in the presence information data structure 106.

Unlike client 1, mobile client 2 is battery powered, and must maintain TCP session 112 through a wireless radio frequency (rf) medium. This makes keeping the TCP connection open an expensive affair, as the mobile device 104 must constantly send or respond to keepalive messages from the IM server 107. Furthermore, mobile device 104 may roam across multiple cellular areas. Wireless service provider data network 102 must keep track of the mobility of mobile device 104, and facilitate handoffs to various cellular towers 103, and possibly, various service nodes (not shown). It is possible that, given enough movement, wireless service provider data network 102 will be unable to continue routing packets to or from mobile device 104, and the TCP connection will be torn down. This results in client 2's presence on the IM server to appear and disappear synchronously with the TCP connection.

More importantly, every time mobile device 104 reestablishes a data connection, it will renegotiate a new TCP session with IM server 107. TCP session initialization and maintenance is expensive from both a bandwidth and battery consumption perspective. Thus it is desirable to allow mobile devices to "hibernate" while maintaining a presence on IM server 107 to receive messages, and only re-initiate a TCP connection when the user is ready to begin using the IM service.

Figure 2:
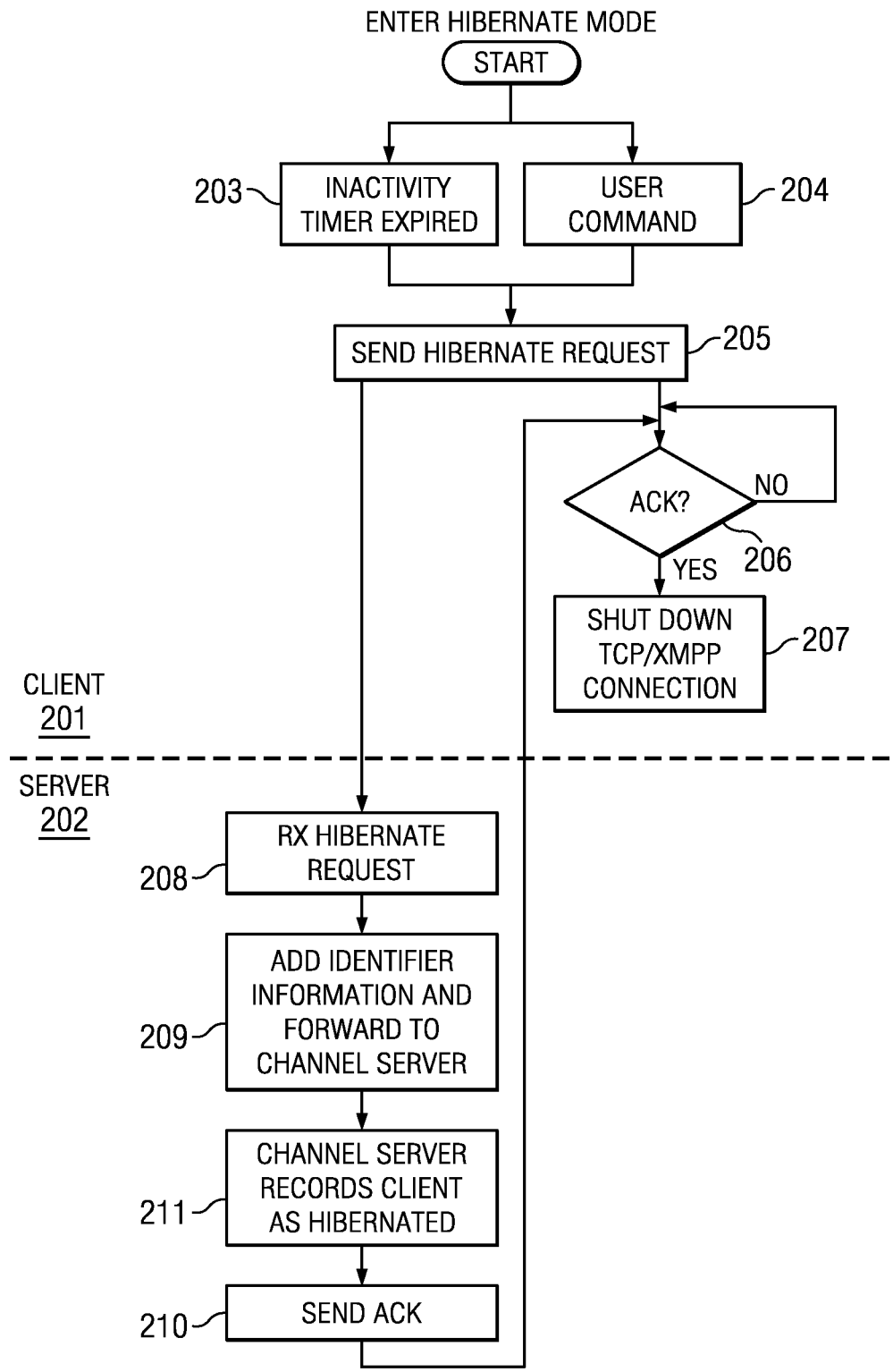
FIG. 2 illustrates an example method for entering a hibernate mode.

FIG. 2 illustrates an example method for entering a hibernate mode. Actions by mobile client 2 are shown in the top half of the flowchart (client 201) above the dotted line. Actions performed by the server 107 are shown in the bottom half of the flowchart (server 202) below the dotted line. The process begins at S, when a user stops using an IM client on his mobile device. The user may initiate the hibernate mode by sending an explicit user command in step 204. Upon receiving the hibernate command, the mobile IM client proceeds to step 205. In particular embodiments, IM client maintains an inactivity timer that measures the amount of time a user has gone without typing a message, sending a message, or otherwise using the client. When the inactivity timer exceeds a predetermined threshold, as in step 203, the IM client proceeds to step 205. In step 205, the IM client transmits the hibernate request to Jabber server 109.

At step 208, Jabber server 109 receives the hibernate request, and at step 209, Jabber server 109 adds identifier information, such as a session identifier (SID) or other information to identify the particular mobile client session. In particular embodiments, mobile device 104 may have multiple chat clients connected to Jabber server 109, and wishes to hibernate one or all of its clients. Thus, Jabber server 109 may append SIDs, client IDs, or some device ID linked to all clients associated with a particular device. Jabber server 109 then forwards the hibernate request to channel server 110. In particular embodiments, the hibernate request may bypass the Jabber server, and mobile device 104 may send hibernate request to channel server 110 directly. In particular embodiments, mobile device 104 may append SIDs or other identifiers to the hibernate request.

At Step 211, channel server 110 records the client 2 as hibernated, but does not alter the presence information displayed to other users. In particular embodiments, channel server 110 may modify client 2's presence to indicate hibernating or "idle" to other users. Channel server 110 maintains the session associated with the SID in the request alive. In particular embodiments, channel server 110 maintains the connection with Jabber server 109 alive as well.

In step 210, after channel server 110 marks client 2 down as hibernated, channel server 110 sends an acknowledgement to mobile device 104. In particular embodiments, Jabber server 109 sends the acknowledgement (ACK).

In step 206, mobile device 104 awaits acknowledgement. In particular embodiments, if mobile device 104 waits longer than a predetermined time period without receiving an ACK, it retransmits the hibernate request.

In step 207, after receiving the ACK, mobile device 104 disconnects, and Jabber server 109 tears down the TCP connection. In particular embodiments, channel server 110 keeps the connection between Jabber server 109 and channel server 110 for client 2 alive. In particular embodiments, mobile device 104 maintains the hibernate mode through pinging web tier 108 every 60 minutes. So long as mobile device 104 has power and a data connection once every 60 minutes, the hibernate mode will be maintained in perpetuity. However, if the predetermined timeout period is exceeded, for example, if 70 minutes elapse without a ping from mobile device, the hibernate mode is dropped and user's presence removed from the channel server.

Figure 3:
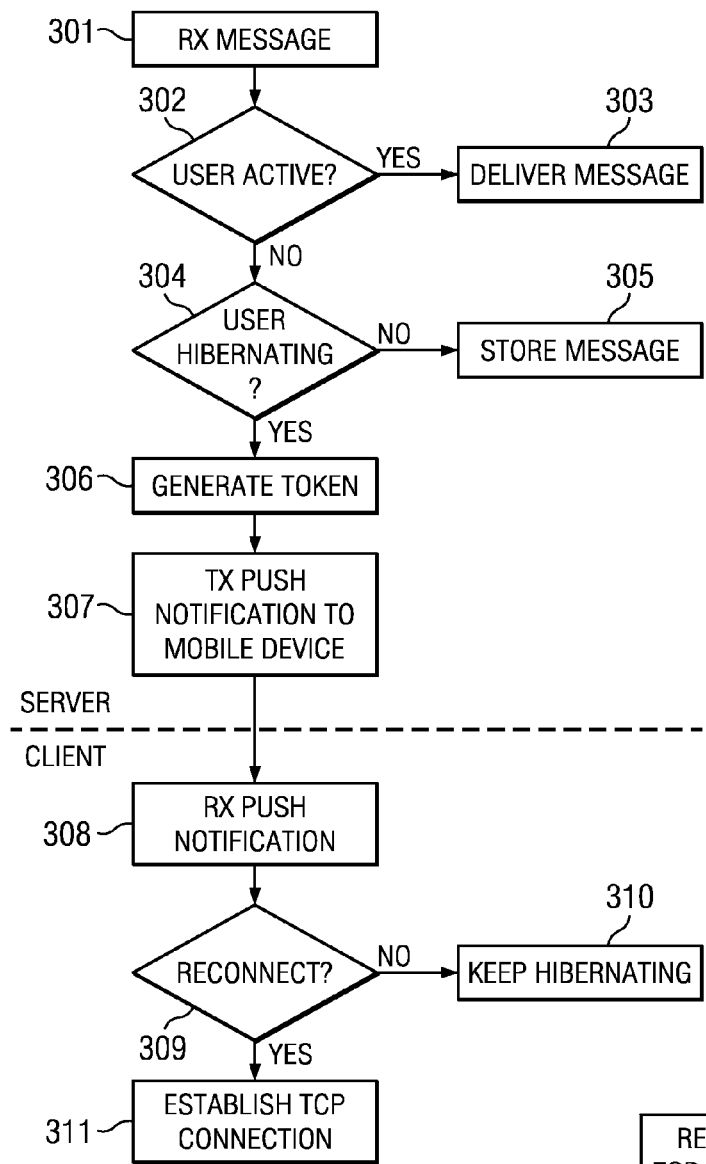
FIG. 3 illustrates an example method of delivering a message to a hibernating client.

FIG. 3 illustrates a method of delivering a message to a hibernating client. In step 301, Jabber server 109 receives a message addressed to client 2. In step 302, Jabber server 109 checks to see whether client 2 is active. Jabber server 109 performs this check by requesting the presence information in presence information data structure 106 from channel server 110. If the user is active, the message is delivered as normal in step 303. If the user is not active, in step 304, Jabber server 109 reads the data structure associated with client 2 in order to determine whether client 2 is hibernating. If client 2 is not hibernating, then in step 305 Jabber server 109 stores the received message for later delivery. If client 2 is marked as hibernating, in 306 Jabber server generates a token for transmission to client 2. In particular embodiments, channel server 110 generates the token.

The token generated by Jabber server 109 acts as a pointer to the received message. Client 2 may receive multiple messages after the first received message after hibernating. The token identifies the first message in a stream of message a user received after hibernating his or her device. In particular embodiments, a token is generated for every message received after client 2 hibernates. In particular embodiments, a token is generated only for the first message received after client 2 hibernates.

In step 307, Jabber server 109 transmits a push notification to mobile device 104. Push notifications may be generated by interacting with an application program interface (API) for the operating system of mobile device 104, such as through the Google Android push notification API. In particular embodiments, push notifications use short message service (SMS) channels, so that users may receive push notifications even when not receiving a data connection. In other embodiments, push notifications may use Microsoft (MS) direct push through use of a TCP tunnel. In particular embodiments, the push notification is generated by an application utilizing the Java Mobile Push API. This disclosure contemplates multiple types and mechanisms of push notification that may be envisioned by one of ordinary skill in the art.

In particular embodiments, part or all of the message is included in the push notification along with the token. In other embodiments, only the sender's chat handle is included in the push notification. In particular embodiments, every single message received after client 2 hibernates is pushed to mobile device 104. In particular embodiments, only the first message received after client 2 hibernates is pushed to mobile device 104.

At step 308, the mobile device 104 receives the push notification. At step 309, user of mobile device 104 is prompted with a choice as to whether to reconnect to the service. If the user of mobile device 104 chooses not to reconnect to the IM service, in step 310, client 2 remains in hibernation mode. If the user of mobile device 104 chooses to reconnect to the IM service, in step 311 mobile device 104 re-establishes a TCP connection to Jabber server 109, and transmits the received token back to the Jabber server.

Figure 4:
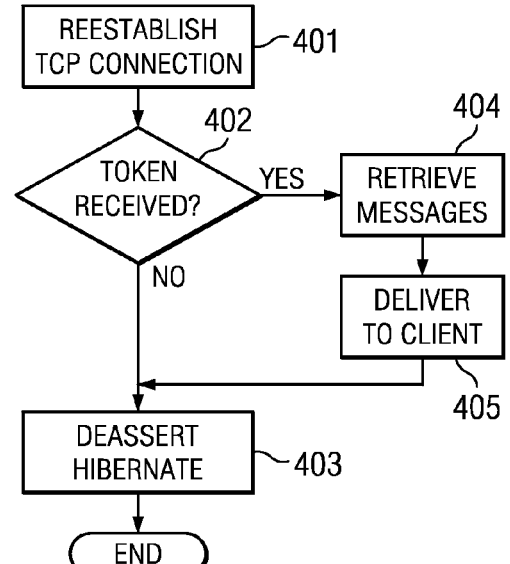
FIG. 4 illustrates an example method of reconnecting a hibernating client.

FIG. 4 illustrates an example reconnection after client 2 has entered hibernate mode. At step 401, Jabber server 109 reestablishes a TCP connection with mobile device 104. At step 402, Jabber server 109 waits for the transmission of the token.

If no token is received, Jabber server 109 communicates at step 503 with channel server 110 to deassert the hibernate designation, and client 2 is treated as a normal active client.

If, at step 402, Jabber server 109 receives a token, the process flows to step 404. At step 404, Jabber server accesses a store of messages addressed to client 2, and retrieves the message associated with the token, along with all subsequently received messages. At step 405, Jabber server 109 delivers these messages to mobile device 104 over its TCP connection 112.

After the messages are delivered, at step 403 Jabber server 109 communicates with channel server 110 to de-assert the hibernate marker for client 2, and client 2 is treated like any other active client.

Figure 5:
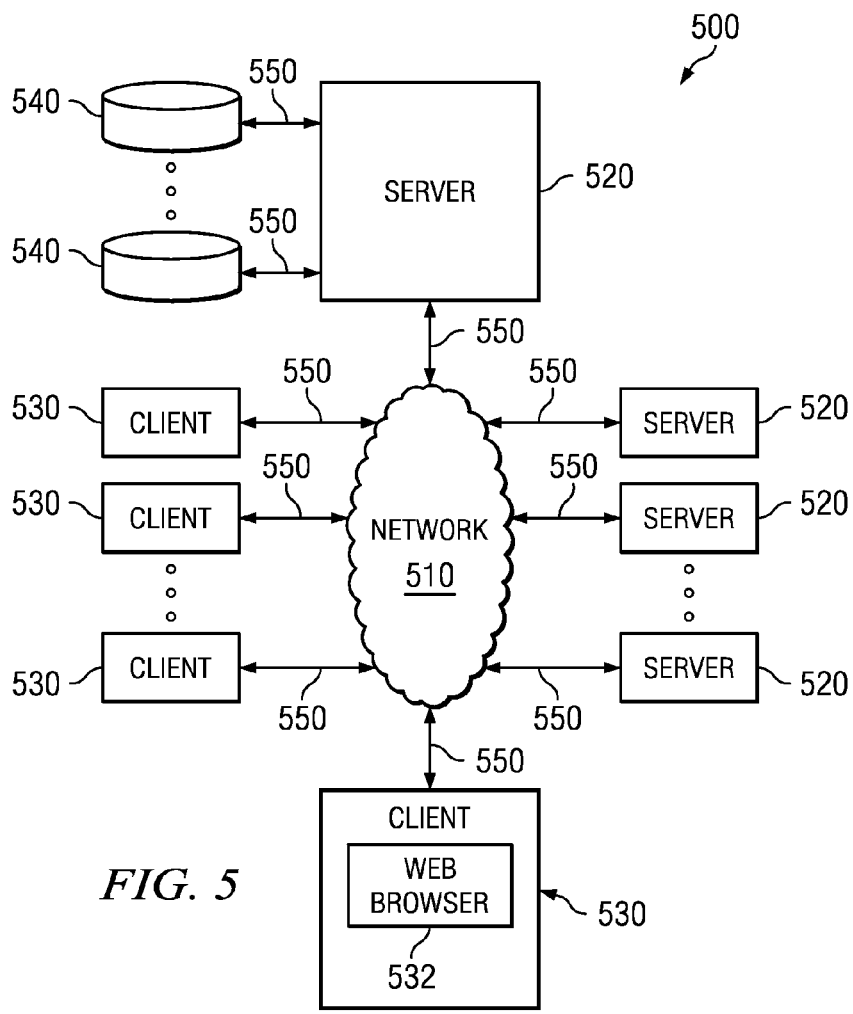
FIG. 5 illustrates an example network environment

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
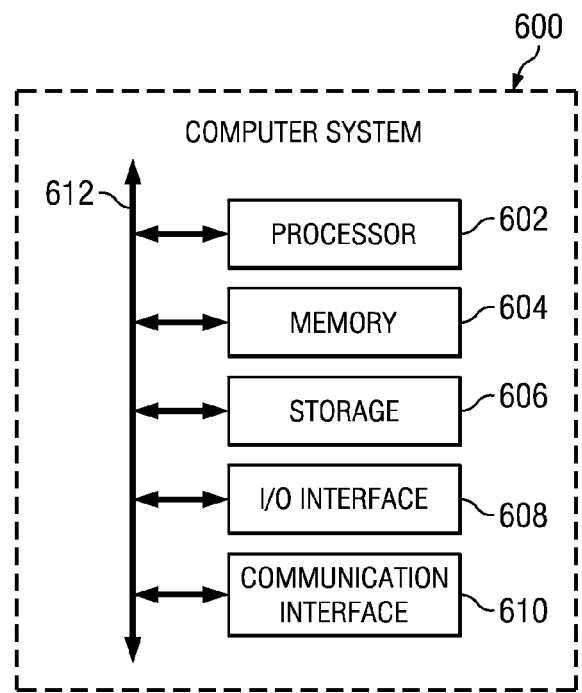
FIG. 6 illustrates an example computing system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
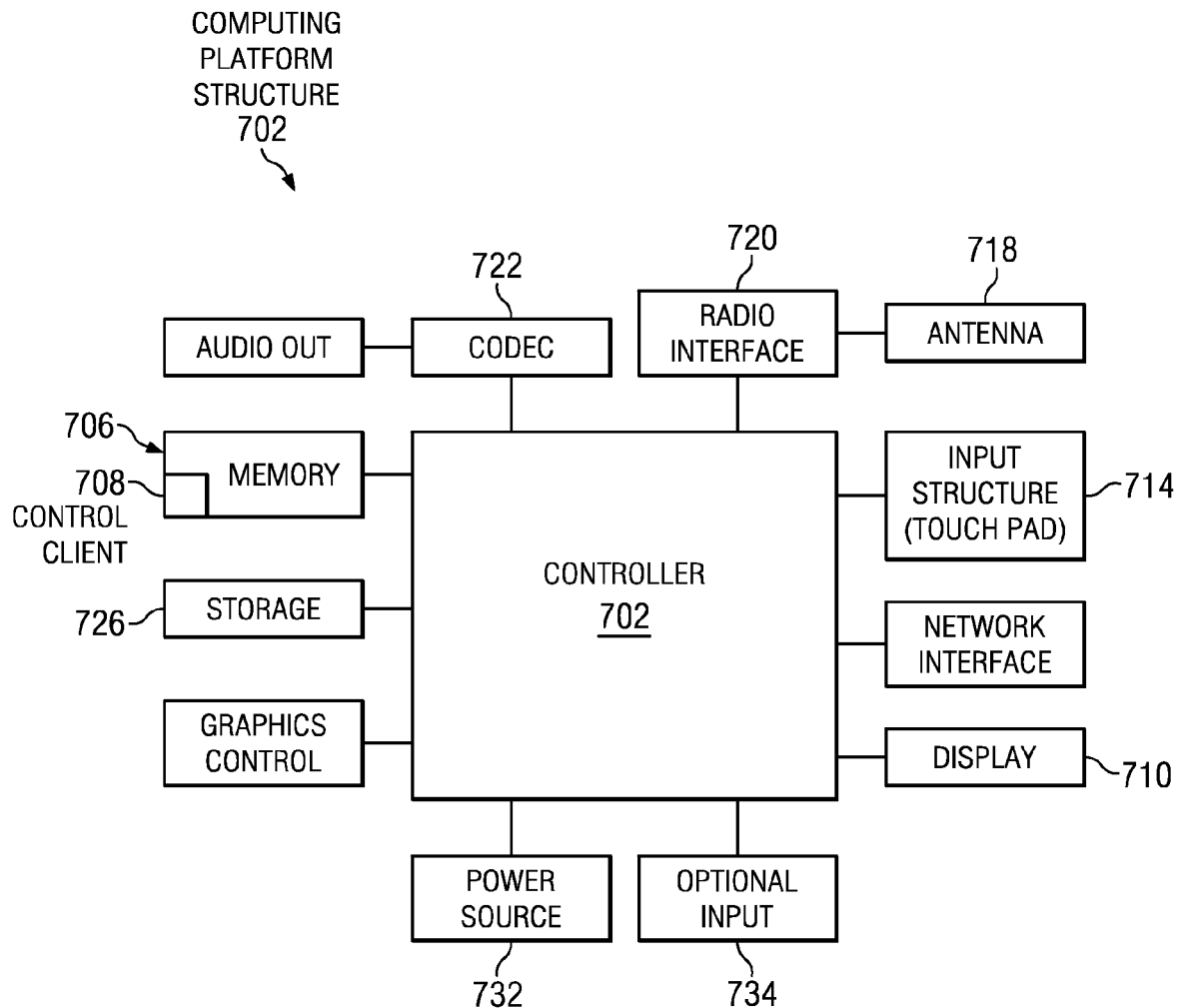
FIG. 7 illustrates an example mobile device.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform 702, according to various particular embodiments. Multipoint sensing devices generally include a controller 704 which may comprise a microcontroller or one or more processors configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 708 described below) and/or data may be physically stored within a memory block 706 that is operatively coupled to controller 704.

Memory block 706 encompasses one or more storage media and generally provides a place to store computer code (e.g., software and/or firmware) and data that are used by the computing platform 702. By way of example, memory block 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory block 706 may also include one or more fixed storage devices in the form of, by way of example, solid-state hard disk drives (HDDs), among other suitable forms of memory coupled bi-directionally to controller 704. Information may also reside on a removable storage medium loaded into or installed in multipoint sensing devices when needed. By way of example, any of a number of suitable memory cards may be loaded into computing platform 702 on a temporary or permanent basis.

Controller 704 is also generally coupled to a variety of interfaces such as graphics control, video interface, input interface, output interface, and storage interface, and network interface, and these interfaces in turn are coupled to the appropriate devices. In certain embodiment, Controller 704 may connected to an input structure 714 and display 716 may be provided together, such an in the case of a touchscreen where a touch sensitive mechanism is provided in conjunction with the display 716. In such embodiments, the user may select or interact with displayed interface elements via the touch sensitive mechanism. In this way, the displayed interface may provide interactive functionality, allowing a user to navigate the displayed interface by touching the display 716.

Electric signals (e.g., analog) may be produced by microphone 710 and fed to earpiece 712. Controller 704 may receive instruction signals from input structure 714 and control the operation of display 716. By way of example, display 716 may incorporate liquid crystal display (LCD), light emitting diode (LED), Interferometric modulator display (IMOD), or any other suitable display technology. Audio signals may be transmitted and received by means of an antenna 718 that may be connected through a radio interface 720 or audio input interface such as microphone 724 to codec 722 configured to process signals under control of controller 704. Additionally, multipoint sensing devices may be powered power source 732.

Mobile device may also include one or more user input devices 734 (other than input structure 714) that are operatively coupled to the controller 704. Generally, input devices 734 are configured to transfer data, commands and responses from the outside world into multipoint sensing devices. By way of example, mobile device may include a keyboard or mouse. Input devices 734 may also include one or more hard buttons.

Display device 716 is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display 716 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   by an instant messaging (IM) server running on a server computing device, receiving an instruction to put an IM client-side application of an IM user into an IM hibernation mode, wherein the IM client-side application is installed on a mobile computing device of the user, wherein the IM user has an active IM status on the IM server, and wherein a communication-protocol session has been established between the IM server and the IM client-side application;
   by the IM server, in response to the instruction, terminating the communication-protocol session to put the IM client-side application into the IM hibernation mode, wherein the mobile computing device remains active, and wherein the IM server maintains an active IM status for the IM user;
   by the IM server, while the IM client-side application is in the IM hibernation mode:
     receiving an instant message for the IM user;
     generating, for the instant message, a token comprising a pointer to the instant message within a stream of instant messages maintained by the IM server for the IM user;
     sending, to the mobile computing device, a push notification comprising the token when the instant message is received by the IM server, the bush notification being sent without re-establishing the communication-protocol session with the IM server; and
   by the IM server, when a timeout period associated with the IM hibernation mode is exceeded, terminating the active IM status of the IM user on the IM server.

2. The method of claim 1, wherein causing the push notification to be sent to the mobile computing device when the instant message for the IM user is received by the IM server while the IM client-side application is in IM hibernation mode comprises:
   causing a push notification comprising the token to be sent to the mobile computing device; and
   storing the instant message in storage associated with the IM server.

3. The method of claim 2, further comprising:
   by the IM server, receiving from the IM client-side application a reconnection request comprising the token;
   by the IM server, re-establishing the communication-protocol session between the IM client-side application and the IM server; and
   by the IM server, causing the instant message corresponding to the token to be sent to the IM client-side application.

4. The method of claim 2, wherein the push notification comprises all or part of the instant message for the IM user.

5. The method of claim 1, wherein the communication-protocol session comprises a Transmission Control Protocol (TCP) session.

6. The method of claim 1, wherein determining if the token should be sent to the mobile computing device comprises stopping the token from being sent if one or more previous tokens were sent after receiving the instruction to put the IM client-side application into the IM hibernation mode.

7. The method of claim 1, wherein the instruction is generated in response to the IM user being inactive with respect to the IM client-side application for a pre-determined period of time.

8. The method of claim 1, further comprising:
   by the IM server, receiving a reconnection request from the IM client-side application; and
   by the IM server, re-establishing the communication-protocol session between the IM client-side application and the IM server.

9. The method of claim 1, wherein the IM server and the server computing device are the same device.

10. The method of claim 1, wherein the IM server and the server computing device are different devices.

11. A server computing device comprising:
    one or more processors; and
    one or more computer-readable non-transitory storage media embodying software to run an IM server that is configured when executed by one or more of the processors to:
    receive an instruction to put an instant messaging (IM) client-side application of an IM user into an IM hibernation mode, wherein the IM client-side application is installed on a mobile computing device of the user, wherein the IM user has an active IM status on the IM server, and wherein a communication-protocol session has been established between the IM server and the IM client-side application;
    in response to the instruction, terminate the communication-protocol session to put the IM client-side application into the IM hibernation mode, wherein the mobile computing device remains active, and wherein the IM server maintains an active IM status for the IM user;
    while the IM client-side application is in the IM hibernation mode:
      receive an instant message for the IM user;
      generate, for the instant message, a token comprising a pointer to the instant message within a stream of instant messages maintained by the IM server for the IM user;
      send, to the mobile computing device, a push notification comprising the token when the instant message is received by the IM server, the push notification being sent without re-establishing the communication-protocol session with the IM server; and
    when a timeout period associated with the IM hibernation mode is exceeded, terminate the active IM status of the IM user on the IM server.

12. The server computing device of claim 11, wherein causing the push notification to be sent to the mobile computing device when the instant message for the IM user is received by the IM server while the IM client-side application is in IM hibernation mode comprises:
    causing a push notification comprising the token to be sent to the mobile computing device; and
    storing the instant message in storage associated with the IM server.

13. The server computing device of claim 12, wherein the software is further configured when executed to:
    receive from the IM client-side application reconnection request comprising the token;

re-establish the communication-protocol session between the IM client-side application and the IM server; and cause the instant message corresponding to the token to be sent to the IM client-side application.

14. The server computing device of claim 12, wherein the push notification comprises all or part of the received instant message for the IM user.

15. The server computing device of claim 11, wherein the communication-protocol session comprises a Transmission Control Protocol (TCP) session.

16. The server computing device of claim 11, wherein determining if the token should be sent to the mobile computing device comprises stopping the token from being sent if one or more previous tokens were sent after receiving the instruction to put the IM client-side application into the IM hibernation mode.

17. The server computing device of claim 11, wherein the instruction is generated in response to the IM user being inactive with respect to the IM client-side application for a pre-determined period of time.

18. The server computing device of claim 11, wherein the software is further configured when executed to:

receive a reconnection request from the IM client-side application; and re-establish the communication-protocol session between the IM client-side application and the IM server.

19. One or more computer-readable non-transitory storage media embodying software to run an IM server that is configured when executed to:

receive an instruction to put an instant messaging (IM) client-side application of an IM user into an IM hibernation mode, wherein the IM client-side application is installed on a mobile computing device of the user, wherein the IM user has an active IM status on the IM server, and wherein a communication-protocol session has been established between the IM server and the IM client-side application;

in response to the instruction, terminate the communication-protocol session to put the IM client-side application into the IM hibernation mode, wherein the mobile computing device remains active, and wherein the IM server maintains an active IM status for the IM user;

while the IM client-side application is in the IM hibernation mode:

receive an instant message for the IM user;

generate, for the instant message, a token comprising a pointer to the instant message within a stream of instant messages maintained by the IM server for the IM user;

send, to the mobile computing device, a push notification comprising the token when the instant message is received by the IM server, the bush notification being sent without re-establishing the communication-protocol session with the IM server; and when a timeout period associated with the IM hibernation mode is exceeded, terminate the active IM status of the IM user on the IM server.

20. The media of claim 19, wherein causing the push notification to be sent to the mobile computing device when the instant message for the IM user is received by the IM server while the IM client-side application is in IM hibernation mode comprises:

causing a push notification comprising the token to be sent to the mobile computing device; and storing the instant message in storage associated with the IM server.

21. The media of claim 20, wherein the software is further configured when executed to:

receive from the IM client-side application a reconnection request comprising the token;

re-establish the communication-protocol session between the IM client-side application and the IM server; and cause the instant message corresponding to the token to be sent to the IM client-side application.

22. The media of claim 20, wherein the push notification comprises all or part of the instant message for the IM user.

* * * * *